(12) United States Patent
Palacino et al.

(10) Patent No.: US 9,838,790 B2
(45) Date of Patent: Dec. 5, 2017

(54) ACQUISITION OF SPATIALIZED SOUND DATA

(71) Applicant: ORANGE, Paris (FR)

(72) Inventors: Julian Palacino, Plestin les Greves (FR); Rozenn Nicol, La Roche Derrien (FR)

(73) Assignee: Orange, Paris (FR)

( * ) Notice: Subject to any disclaimer, the term of this patent is extended or adjusted under 35 U.S.C. 154(b) by 64 days.

(21) Appl. No.: 14/442,440

(22) PCT Filed: Nov. 15, 2013

(86) PCT No.: PCT/FR2013/052749
§ 371 (c)(1),
(2) Date: May 13, 2015

(87) PCT Pub. No.: WO2014/076430
PCT Pub. Date: May 22, 2014

(65) Prior Publication Data
US 2016/0277836 A1 Sep. 22, 2016

(30) Foreign Application Priority Data

Nov. 16, 2012 (FR) ..................... 12 60898

(51) Int. Cl.
H04R 3/00 (2006.01)
H04R 5/027 (2006.01)
(Continued)

(52) U.S. Cl.
CPC ............ H04R 5/027 (2013.01); G01S 3/8036 (2013.01); H04R 3/005 (2013.01); H04S 7/301 (2013.01);
(Continued)

(58) Field of Classification Search
CPC ...... H04R 3/00; H04R 3/005; H04R 2430/20; H04R 5/027; H04R 2430/21; H04S 2400/15; H04S 7/301; H04S 2420/11
See application file for complete search history.

(56) References Cited

U.S. PATENT DOCUMENTS 4,042,779 A      8/1977  Craven et al.
6,600,824 B1 *   7/2003  Matsuo ................. H04R 3/005
                                                     381/122
(Continued)

FOREIGN PATENT DOCUMENTS

WO      2012/072798 A1      6/2012

OTHER PUBLICATIONS

Berge et al., "A new method for B-format to binaural transcoding," AES 40th International Conference, Tokyo, Japan, Oct. 8-10, 2010, pp. 1-10 (Oct. 2010).
(Continued)

Primary Examiner — Andrew L Sniezek
(74) Attorney, Agent, or Firm — Drinker Biddle & Reath LLP

(57) ABSTRACT

A data-processing method for determining at least one spatial coordinate of a sound source emitting a sound signal, in a three-dimensional space, includes the following steps: obtaining at least one first signal and one second signal from the sound signal, collected according to separate directivities by a first sensor and a second sensor; deducing from the first and second signals an expression of at least one first spatial coordinate of the sound source, the expression comprising an uncertainty; determining additional information relating to the first spatial coordinate of the sound source, from a comparison between the respective features of the signals collected by the first and second sensors; and determining
(Continued)

the first spatial coordinate of the sound source on the basis of the expression and the additional information.

17 Claims, 4 Drawing Sheets

(51) Int. Cl.
  *G01S 3/803* (2006.01)
  *H04S 7/00* (2006.01)

(52) U.S. Cl.
  CPC ............ *H04R 3/00* (2013.01); *H04R 2430/20* (2013.01); *H04R 2430/21* (2013.01); *H04S 2400/15* (2013.01); *H04S 2420/11* (2013.01)

(56) References Cited

U.S. PATENT DOCUMENTS 9,351,071 B2 * 5/2016 Kechichian ............ G01S 3/8083
2004/0032796 A1 2/2004 Chu et al.
2010/0211387 A1 8/2010 Chen
2015/0223003 A1 * 8/2015 Hetherington ........ H04M 3/568
  381/303

OTHER PUBLICATIONS

Daniel, "Representation of acoustic fields, application to the transmission and reproduction of complex sound scenes in a multimedia context," Thèse de doctorat de l'Université Paris 6, Paris, pp. 1-319 (Jul. 31, 2001).

Pulkki, "Directional audio coding in spatial sound reproduction and stereo upmixing," Proc. of AES 28th International Conference, Pitea, Sweden, Jun. 30-Jul. 2, 2006, pp. 1-8 (Jun. 2006).

* cited by examiner

ACQUISITION OF SPATIALIZED SOUND DATA

CROSS-REFERENCE TO RELATED APPLICATIONS

This application is the U.S. national phase of the International Patent Application No. PCT/FR2013/052749 filed Nov. 15, 2013, which claims the benefit of French Application No. 12 60898 filed Nov. 16, 2012, the entire content of which is incorporated herein by reference.

FIELD

The present invention relates to the field of the technologies of sound take and the associated audio processing technologies.

BACKGROUND

It relates in particular, but not exclusively, to a method for processing acoustic data originating from a three-dimensional sound scene capable of extracting an item of information relating to the spatial position of sound sources. It can be used equally well in applications for spatialized sound take within the context of conversational services, as for the recording of 3D audio content (for example a concert, a soundscape, etc).

Various methods of spatialized sound take are known. Some seek to capture the information utilized by the auditory system (binaural technology for example) while others break down the acoustic field so as to reproduce more or less rich spatial information which will be interpreted by the listener (ambisonic technology for example).

A first method consists of a stereophonic sound take. The differences of phase and/or time, and amplitude, between signals originating from two microphones are utilized in order to recreate stimuli constituting a rough approximation to natural listening. These signals are restored via a pair of loudspeakers always placed facing the listener and aligned in the horizontal plane. In such a configuration, all information originating from behind the listener and all concept of elevation are lost. In order to enrich the rear of the sound scene, numerous solutions have been proposed. In particular, such solutions generally consist of an increase in the number of sensors targeting the sought directions. Provision can also be made for mastering the stereophonic signals in order to enrich the rear of the sound scene. Such solutions gave rise to 5.1 and 7.1 quadraphonic systems.

However, the stereophonic sound take is still limited to the frontal horizontal plane, or the horizontal plane in the case of the multichannel extensions of the 5.1 type. In other words, in the best case, with spherical coordinates, it is only capable of identifying the azimuth information of the sound sources (the coordinates of the sources in a horizontal plane x-y), without, however, being able to identify their elevation information.

A second method consists of a binaural sound take. Binaural technology allows capture and restoration imitating natural listening, allowing in particular the localization of a source within the entire space surrounding the listener, using only two microphones. The microphones are placed in the ears of a person or of a dummy in order to record the acoustic scene and the sound indices of natural localization.

However, direct sound take using binaural technology has various drawbacks. In fact, when the sound take is carried out on the head of a person, the person wearing the microphones must remain immobile, control his respiration and avoid swallowing in order not to degrade the quality of the recording. The use of an artificial head is difficult to envisage when an unobtrusive, portable use is sought. At the time of reproduction, the incompatibility of the transfer functions relating to the listener's head (Head Related Transfer Function" or HRTF) between the capture device and the final listener tends to falsify the localization of the sources. Furthermore, when the final listener moves his head, the entire sound scene is displaced.

Thus, although binaural sound take is capable of encoding the spatial information of the sources in any three-dimensional space, such encoding is specific to the morphology of the person or the dummy which was used for the recording. To date, no satisfactory solution has been proposed to remedy these limitations. An additional drawback is that binaural recording can only be listened to on specific dedicated equipment such as a helmet or a system of loudspeakers, combined with pre-processing.

A third method consists of an ambisonic sound take by capture of the sound field. Such a technology was introduced in document U.S. Pat. No. 4,042,779 for first-order spherical harmonics, and its extension to higher orders, (higher-order ambisonics or HOA), was described for example in the document J. Daniel, "Représentation de champs acoustiques, application á la transmission et á la reproduction de scénes sonores complexes dans un contexte multimédia", [Representation of acoustic fields, application to the transmission and reproduction of complex sound scenes in a multimedia context] Université Paris 6, Paris, 2001. These documents allow more or less accurate acquisition of the sound scene, depending on the order of the spherical harmonics used.

However, such technology has the drawback of using a large number of sensors, which is a function of the desired order. The use of first-order ambisonic technology has been widely exploited due to the small number of sensors required for its implementation (four microphones, see U.S. Pat. No. 4,042,779). Signals originating from the four microphones are derived by mastering (encoding), the four signals defining the B-format ambisonic technology. The signals derived by mastering correspond to the signals which would have been recorded by an omnidirectional microphone and three velocity gradient microphones oriented along axes x, y and z. The four derived signals are recorded and can then be reproduced to a listener by using a system of arbitrarily distributed loudspeakers by means of a decoding matrix. The loudspeakers chosen in this way can also be obtained in the form of virtual sources for binaural reproduction, using the HRTF transfer functions relating to the position of each source.

Thus, the ambisonic sound take is also capable of encoding the spatial information of the sources throughout the 3D space, but it has the drawback of requiring a large number of sensors, namely a minimum of 4, and potentially an even greater number when satisfactory spatial accuracy is sought.

Post-processing combined with the spatialized sound take can also be envisaged, in order to overcome the drawbacks detailed above.

In particular, such processing methods are applied in order to improve the extraction of the spatial information. To date, post-processing has been applied to signals of the ambisonic type, because the latter give access to a physical representation of the acoustic waves.

The document by V. Pulkki, "*Directional audio coding in spatial sound reproduction and stereo upmixing*", in Proc. of the AES 28th Int. Conf, Pitea, Sweden, 2006, proposes a method for extracting the localization information of the sources from B-format signals. The objective of such a method is to obtain a more compact representation of the three-dimensional sound scene (data compression), in which the four signals originating from the B-format are restored to a single monophonic signal accompanied by a signal containing the localization information of the sound sources.

An improvement to this method was proposed in the document by N. Barrett and S. Berge, "*A new method for B-format to binaural transcoding*", in 40th AES International conference. Tokyo, Japan, 2010, p. 8-10. This improvement provides for the use of the localization information in order to spatialize the virtual sound sources with a view to reproduction via loudspeakers or binaural transcoding. The virtual sound sources are thus re-spatialized afterwards in accordance with their identified position, in the spatialization format associated with the reproduction device.

However, regardless of the preceding method or its improved version, the position of the sources is determined with an ambiguity (typically an angular ambiguity of $\pm\pi/2$ on the azimuth angle in the document by V. Pulkki), which is not resolved. The position of the sound source is then not known with certainty.

SUMMARY

The present invention improves the situation.

A first aspect of the invention relates to a data processing method for determining at least one spatial coordinate of a sound source emitting a sound signal, in a three-dimensional space, the method comprising the following steps:
  obtaining at least one first signal and one second signal from the sound signal captured according to different directivities by a first sensor and a second sensor;
  deducing from the first and second signals an expression of at least one first spatial coordinate of the sound source, the expression containing an uncertainty in the spatial coordinate;
  determining an item of supplementary information relating to the first spatial coordinate of the sound source, from a comparison between respective characteristics of the signals captured by the first and second sensors;
  determining the first spatial coordinate of the sound source based on the expression and supplementary information.

Thus, provision is made by the present invention, from a reduced number of sensors (at least two) to remove an uncertainty in an expression of a spatial coordinate of a sound source, by determining an item of supplementary information which utilizes the characteristics of the signals received respectively on the sensors. For example, the uncertainty can be due to an inverse cosine function as is the case in the document by V. Pulkki.

The present invention thus makes it possible to improve the accuracy during the localization of the source (determination of a spatial coordinate of the source). In addition, the present invention can be adapted to any microphonic unit comprising the first and second sensors. Thus, as detailed hereinafter, the first and second sensors can be cardioid microphones, bidirectional microphones, or be incorporated into an ambisonic microphone of the first order, or more generally, having an order greater than one.

According to an embodiment, the space being oriented according to three axes x, y and z, the first and second sensors are cardioid microphones, the first cardioid microphone being situated in a first position of the space and oriented along the x-axis in a direction of increase and the second cardioid microphone being situated in a second position of the space and oriented along the x axis in a direction of decrease, the method can comprise initially:
  modifying the first or the second position so as to introduce a shift along the y-axis between the first cardioid microphone and the second cardioid microphone.

The first and second signals correspond to the sound signals captured respectively by the first and second cardioid microphones and the supplementary information is the sign of a difference between respective phases of the first and second signals.

By shifting the cardioid microphones along an axis perpendicular to the axis of orientation of the cardioid microphones, the invention allows the introduction of a delay between the signals captured by these microphones, a delay which constitutes an item of supplementary information from which it is possible to determine with certainty the first spatial coordinate.

First and second spatial coordinates of the sound source can be respectively the spherical coordinates of azimuth $\theta$ and of elevation $\phi$. As detailed hereinafter, the spatial coordinates can be expressed in the time domain or in the frequency domain. In addition, a third signal $s_{card3}$ captured by a third cardioid microphone oriented along the z-axis in a direction of increase can be obtained. The first signal captured by the first cardioid microphone being denoted $s_{card1}$ and the second signal captured by the second cardioid microphone being denoted $s_{card2}$, the expressions of the spherical coordinates of azimuth $\theta$ and of elevation $\phi$ can be given by:

$$s_0(t) = s_{card1}(t, \theta, \phi) + s_{card2}(t, \theta, \phi)$$

$$\phi = \sin^{-1}\left[2\frac{s_{card3}(t, \theta, \phi)}{s_0(t, \theta, \phi)} - 1\right]$$

$$\theta = \cos^{-1}\left[\frac{s_{card1}^2(t, \theta, \phi) - s_{card2}^2(t, \theta, \phi)}{s_0(t)^2 \cdot \cos\phi}\right]$$

The sign of the azimuth spherical coordinate $\theta$ is given by the phase difference between the first and second signals.

The expression of the azimuth spherical coordinate $\theta$ has an ambiguity resulting from the inverse cosine function. This ambiguity is removed for example by exploiting the phase difference between the first and second signals which gives the sign of the azimuth spherical coordinate $\theta$. However, the invention is in no way limited to taking account of the phase difference between the first and second signals: it applies to any supplementary information making it possible to identify the half space in which the sound source is situated, which makes it possible to remove the aforementioned ambiguity.

Thus, the present invention makes it possible to fully determine the direction of the sound source (knowledge of the spherical coordinates of azimuth $\theta$ and of elevation $\phi$) from only three sensors, namely the three cardioid microphones, while removing the uncertainty in the azimuth spherical coordinate $\theta$. It should be noted that no restriction is attached to the coordinates in question: the present invention is applicable using cylindrical or Cartesian coordinates.

In a variant, first and second spatial coordinates of the sound source can be respectively the spherical coordinates of azimuth $\theta$ and of elevation $\phi$, the first signal captured by the first cardioid microphone being denoted $s_{card1}$ and the second signal captured by the second cardioid microphone being denoted $s_{card2}$, the expression of the azimuth spherical coordinate θ is given by:

$$s_0(t) = s_{card1}(t, \theta, \phi) + s_{card2}(t, \theta, \phi)$$

$$\theta = \cos^{-1}\left[\frac{s_{card1}^2(t, \theta, \phi) - s_{card2}^2(t, \theta, \phi)}{s_0(t)^2 \cdot \cos\phi}\right]$$

The elevation spherical coordinate φ can be fixed arbitrarily and the sign of the azimuth spherical coordinate θ can be given by the phase difference between the first and second signals.

This variant makes it possible to reduce the number of sensors to only two cardioid microphones, to the detriment of the accuracy linked to the elevation spherical coordinate φ, while removing the uncertainty in the azimuth spherical coordinate θ.

According to an embodiment of the invention, the space being oriented according to three axes x, y and z, first and second spatial coordinates of the sound source can be the spherical coordinates of azimuth θ and of elevation φ, the first and second sensors can be bidirectional sensors, the first sensor being oriented along the x-axis and capturing the signal denoted $s_{bi1}$ and the second sensor being oriented along the y-axis and capturing the signal denoted $s_{bi2}$.

A third cardioid sensor can be directed along the z-axis in the direction of increase and be suitable for capturing a signal denoted $s_{card3}$. The first and second signals can be denoted respectively $s_{cardvirt1}$ and $s_{cardvirt2}$ and be obtained by:

$$s_{cardvirt1}(t, \theta, \phi) = \frac{s_0(t)}{2}\left(1 + \frac{s_{bi2}(t, \theta, \phi)}{s_0(t)}\right);$$

$$s_{cardvirt2}(t, \theta, \phi) = \frac{s_0(t)}{2}\left(1 - \frac{s_{bi2}(t, \theta, \phi)}{s_0(t)}\right);$$

with $$s_0(t) = \frac{s_{bi1}^2(t, \theta, \phi) + s_{bi2}^2(t, \theta, \phi) + 4s_{card3}^2(t, \theta, \phi)}{4s_{card3}^2(t, \theta, \phi)}.$$

The expressions of the spherical coordinates of azimuth θ and of elevation φ can be given by:

$$\phi = \sin^{-1}\left[2\frac{s_{card3}(t, \theta, \phi)}{s_0(t, \theta, \phi)} - 1\right]$$

$$\theta = \cos^{-1}\left[\frac{s_{cardvirt1}^2(t, \theta, \phi) - s_{cardvirt2}^2(t, \theta, \phi)}{s_0(t)^2 \cdot \cos\phi}\right]$$

The supplementary information for removing the ambiguity can be determined from a direction of an acoustic intensity vector of the sound signal, the direction being calculated from the signals $s_{bi1}$ and $s_{bi2}$.

Thus, the present invention is applicable when the sound signal is initially captured by bidirectional microphones. In fact, by obtaining the first and second signals, virtual cardioid microphones are synthesized, which makes it possible to return to expressions similar to the first embodiment for the spherical coordinates of azimuth and of elevation. On the other hand, in the case of bidirectional microphones, it is not possible to introduce a delay, and provision is then made in the invention to take account of a direction of an acoustic intensity vector of the sound signal, the direction being calculated from the signals captured by these microphones, in order to remove the uncertainty with respect to the determination of the azimuth spherical coordinate. Again, only three sensors allow complete determination of the direction of the sound source.

In a variant, the space being oriented according to three axes x, y and z, the first and second spatial coordinates can be the spherical coordinates of azimuth θ and of elevation φ, the first and second sensors can be bidirectional sensors, the first sensor being oriented along the x-axis and capturing the signal denoted $s_{bi1}$ and the second sensor being oriented along the y-axis and capturing the signal denoted $s_{bi2}$; the first and second signals can be denoted respectively $s_{cardvirt1}$ and $s_{cardvirt2}$ and can be obtained as follows:

$$s_{cardvirt1}(t, \theta, \phi) = \frac{s_0(t)}{2}\left(1 + \frac{s_{bi2}(t, \theta, \phi)}{s_0(t)}\right);$$

$$s_{cardvirt2}(t, \theta, \phi) = \frac{s_0(t)}{2}\left(1 - \frac{s_{bi2}(t, \theta, \phi)}{s_0(t)}\right);$$

with $s_0(t) = \sqrt{s_{bi1}^2(t,\theta,\phi) + s_{bi2}^2(t,\theta,\phi)}$.

The expression of the azimuth spherical coordinate θ can be given by:

$$\theta = \cos^{-1}\left[\frac{s_{cardvirt1}^2(t, \theta, \phi) - s_{cardvirt2}^2(t, \theta, \phi)}{s_0(t)^2 \cdot \cos\phi}\right]$$

The elevation spherical coordinate φ is fixed arbitrarily and the supplementary information can be determined from a direction of an acoustic intensity vector of the sound signal, the direction being calculated from the signals $s_{bi1}$ and $s_{bi2}$.

Thus, it is possible to reduce the number of sensors to two bidirectional microphones while removing the uncertainty in the azimuth spherical coordinate θ, to the detriment of the accuracy as regards the determination of the elevation spherical coordinate φ.

In addition, the supplementary information can be a second expression of the azimuth spherical coordinate θ:

$$\theta(\omega) = \tan^{-1}\left(\frac{I_y(\omega)}{I_x(\omega)}\right)$$

ω being a pulse of the sound signal emitted by the source, $I_y(\omega)$ being the component along the y-coordinate of the acoustic intensity vector of the sound signal, given by:

$$I_y(\omega) = \frac{1}{2\rho c} Re[S_0^*(\omega) S_{bi2}(\omega)];$$

$I_x(\omega)$ being the component along the x-coordinate of the acoustic intensity vector of the sound signal, given by:

$$I_x(\omega) = \frac{1}{2\rho c} Re[S_0^*(\omega) S_{bi1}(\omega)];$$

$S_0(\omega)$, $S_{bi1}(\omega)$ and $S_{bi2}(\omega)$ denoting the Fourier transforms of the signals $s_0(t)$, $s_{bi1}(t)$ and $s_{bi2}(t)$ respectively.

Thus, by obtaining a supplementary expression on the azimuth spherical coordinate θ, it is possible of remove the uncertainty linked to the first expression comprising the inverse cosine function. In fact, although the inverse tangent function also has an uncertainty, the inverse tangent function and the inverse cosine function make it possible to obtain two estimations of the azimuth spherical coordinate θ which are complementary. For example, as detailed below, the use of a table makes it possible to differentiate four scenarios, according to the intervals in which the two estimations of the azimuth spherical coordinate θ are situated. A disambiguated value of the azimuth spherical coordinate θ can be determined. In complement, it is possible to take account of the factors linked to the sound scene to be studied (number of sources, noise level, complexity) in order to select one or other of the disambiguated expressions of the azimuth spherical coordinate θ.

According to an embodiment, first and second spatial coordinates of the sound source can be spherical coordinates of azimuth θ and of elevation φ, the first and second sensors can form part of an ambisonic microphone of the first order or of order greater than one more generally, the signals originating from the ambisonic microphone can be a pressure signal $b_{00}^1(t)$ and three pressure gradient signals $b_{11}^1(t)$, $b_{11}^{-1}(t)$ and $b_{10}^1(t)$.

The first signal, denoted $s_{cardvirt1}$, and the second signal, denoted $s_{cardvirt2}$, and a third signal $s_{cardvirt3}$ can be obtained from the signals $b_{00}^1(t)$, $b_{11}^1(t)$, $b_{11}^{-1}(t)$ and $b_{10}^1(t)$ by:

$$s_{cardvirt1}(t, \theta, \phi) = \frac{b_{00}^1(t)}{2}\left(1 + \frac{b_{11}^{-1}(t)}{b_{00}^1(t)}\right);$$

$$s_{cardvirt2}(t, \theta, \phi) = \frac{b_{00}^1(t)}{2}\left(1 - \frac{b_{11}^{-1}(t)}{b_{00}^1(t)}\right);$$

$$s_{cardvirt3}(t, \theta, \phi) = \frac{b_{00}^1(t)}{2}\left(1 + \frac{b_{10}^1(t)}{b_{00}^1(t)}\right).$$

The expressions of the spherical coordinates of azimuth θ and of elevation φ can then be given by:

$$\phi = \sin^{-1}\left[2\frac{s_{cardvirt3}(t, \theta, \phi)}{s_0(t, \theta, \phi)} - 1\right]$$

$$\theta = \cos^{-1}\left[\frac{s_{cardvirt1}^2(t, \theta, \phi) - s_{cardvirt2}^2(t, \theta, \phi)}{s_0(t)^2 \cdot \cos\phi}\right]$$

with $s_0 = b_{00}^1(t)$.

The supplementary information can be determined from a direction of an acoustic intensity vector of the sound signal, the direction being calculated from the signals $b_{00}^1(t)$, $b_{11}^1(t)$ and $b_{11}^{-1}(t)$.

Thus, the present invention is applicable when the sound signals are initially captured by a first-order ambisonic microphone, such as the microphone described in the U.S. Pat. No. 4,042,779. In fact, by obtaining the first and second signals, virtual cardioid microphones are synthesized, which makes it possible to return to expressions similar to the first embodiment for the spherical coordinates of azimuth and of elevation. However, in the case of a first-order ambisonic microphone, it is not possible to introduce a delay, and provision is then made in the invention to take account of a direction of an acoustic intensity vector of the sound signal, the direction being calculated from the signals captured by these microphones, in order to remove the uncertainty with respect to the determination of the azimuth spherical coordinate. Thus, the direction of the sound source can be determined without uncertainty, but nevertheless without the need to introduce additional microphones.

In addition, the supplementary information can be a second expression of the azimuth spherical coordinate θ:

$$\theta(\omega) = \tan^{-1}\left(\frac{I_y(\omega)}{I_x(\omega)}\right)$$

ω being a pulse of the sound signal emitted by the source, $I_y(\omega)$ being given by:

$$I_y(\omega) = \frac{1}{2\rho c} Re[B_{00}^{1*}(\omega) B_{11}^{-1}(\omega)];$$

$I_x(\omega)$ being given by:

$$I_x(\omega) = \frac{1}{2\rho c} Re[B_{00}^{1*}(\omega) B_{11}^{1}(\omega)];$$

$B_{00}^1(\omega)$, $B_{11}^1(\omega)$ and $B_{11}^{-1}(\omega)$ denoting the Fourier transforms of the signals $b_{00}^1(t)$, $b_{11}^1(t)$ and $b_{11}^{-1}(t)$ respectively.

Thus, by obtaining a supplementary expression with respect to the azimuth spherical coordinate θ, it is possible to remove the uncertainty linked to the first expression comprising the inverse cosine function. In fact, although the inverse tangent function also has an uncertainty, the inverse tangent function and the inverse cosine function make it possible to obtain two estimations of the azimuth spherical coordinate θ which are complementary. For example, as detailed hereinafter, the use of a table makes it possible to differentiate four scenarios, according to the intervals in which the two estimations of the azimuth spherical coordinate θ are situated. A disambiguated value of the azimuth spherical coordinate θ can be determined. In addition, it is possible to take account of the factors linked to the sound scene to be studied (number of sources, noise level, complexity) in order to select one or other of the disambiguated expressions of the azimuth spherical coordinate θ.

In complement or alternatively, a supplementary expression can be determined for the elevation spherical coordinate:

$$\phi(\omega) = \tan^{-1}\left(\frac{I_z(\omega)}{\sqrt{I_x^2(\omega) + I_y^2(\omega)}}\right)$$

ω being a pulse of the sound signal emitted by the source, $I_y(\omega)$ being the component along the y-coordinate of the acoustic intensity vector of the sound signal and being given by:

$$I_y(\omega) = \frac{1}{2\rho c} Re[B_{00}^{1*}(\omega) B_{11}^{-1}(\omega)];$$

$I_x(\omega)$ being the component along the x-coordinate of the acoustic intensity vector of the sound signal and being given by:

$$I_x(\omega) = \frac{1}{2\rho c} Re[B_{00}^{1*}(\omega) B_{11}^{1}(\omega)];$$

$I_z(\omega)$ being given by:

$$I_z(\omega) = \frac{1}{2\rho c} Re[B_{00}^{1*}(\omega) B_{01}^{1}(\omega)];$$

$B_{00}^{1}(\omega)$, $B_{11}^{1}(\omega)$, $B_{01}^{1}(\omega)$ and $B_{11}^{-1}(\omega)$ denoting the Fourier transforms of the signals $b_{00}^{1}(t)$, $b_{11}^{1}(t)$, $b_{01}^{1}(t)$ and $b_{11}^{-1}(t)$ respectively.

The elevation spherical coordinate can be determined from the expression or from the supplementary expression.

Thus, as for the determination of the azimuth spherical coordinate, it is possible to prefer one or other of the expressions determined for the elevation spherical coordinate. Again, this choice can be made depending on factors linked to the sound scene to be studied, such as the number of sources, the noise level, the complexity, etc.

A second aspect of the invention relates to a computer program comprising program code instructions recorded on a medium which can be read by a computer, for implementing steps of the method according to the first aspect of the computer.

A third aspect of the invention relates to a data processing device for determining at least one spatial coordinate of a sound source emitting a sound signal, in a three-dimensional space, the device comprising:
  a unit for obtaining at least one first signal and one second signal from the sound signal captured according to different directivities by a first sensor and a second sensor;
  a deduction unit for deducing from the first and second signals an expression of at least one first spatial coordinate of the sound source, the expression containing an uncertainty in said spatial coordinate;
  a first unit for determining an item of supplementary information relating to the first spatial coordinate of the sound source, from a comparison between respective characteristics of the signals captured by the first and second sensors;
  a second unit for determining the first spatial coordinate of the sound source based on the expression and supplementary information.

A fourth aspect of the invention relates to a system for the acquisition of sound data, comprising a microphonic unit, the microphonic unit comprising at least one first sensor and one second sensor suitable for capturing sound signals according to different directivities, the system comprising moreover a data processing device for determining at least one spatial coordinate of a sound source emitting a sound signal, in a three-dimensional space, the device comprising:
  a unit for obtaining at least one first signal and one second signal from the sound signal captured by the first sensor and the second sensor;
  a deduction unit for deducing from the first and second signals an expression of at least one first spatial coordinate of the sound source, said expression containing an uncertainty in the spatial coordinate;
  a first unit for determining an item of supplementary information relating to the first spatial coordinate of the sound source, from a comparison between respective characteristics of the signals captured by the first and second sensors;
  a second unit for determining said first spatial coordinate of the sound source based on the expression and supplementary information.

According to an embodiment, the first and second sensors can be cardioid microphones. In a variant, the first and second sensors can be bidirectional microphones.

A fifth aspect of the invention relates to a telecommunications terminal comprising a system for the acquisition of sound data according to the fourth embodiment.

BRIEF DESCRIPTION OF THE DRAWINGS

Other features and advantages of the invention will become apparent on examination of the detailed description hereinafter, and the attached drawings in which.

DETAILED DESCRIPTION

Figure 1:
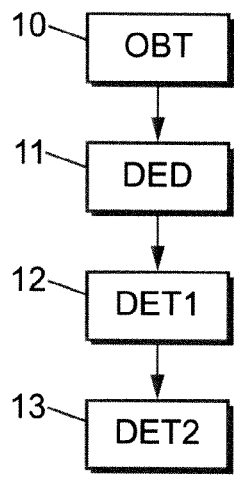
FIG. 1 is a diagram representing the general steps of a data processing method according to an embodiment.

FIG. 1 is a diagram showing the general steps of a data processing method according to an embodiment of the invention;

The method allows the determination of at least one spatial coordinate of a sound source emitting a sound signal, in a three-dimensional space. By spatial coordinate is meant any coordinate from a system of three coordinates making it possible to reference the sound source in the three-dimensional space. No restriction is attached to the system of coordinates in question. For example, it can involve spherical, Cartesian or cylindrical coordinates.

In a step 10, at least one first signal and one second signal are obtained from the sound signal captured according to different directivities by a first sensor and a second sensor. By sensor is meant any microphonic system for the acquisition of sound data. The sensors in question depend on the specific microphonic system. Numerous examples of microphonic systems are presented hereinafter and the invention is thus applicable to any microphonic system. As the sensors have different directivities, they capture two separate signals, although these signals originate from the same sound signal emitted by the sound source.

In a step 11, an expression of at least one first spatial coordinate of the sound source is determined based on the first and second signals, such an expression containing an uncertainty in the spatial coordinate. As mentioned in the introductory section, the uncertainty can be an angular ambiguity of ±π/2 on the azimuth angle. This is for example the case when the first spatial coordinate is expressed in the form of an inverse cosine function. The present invention makes it possible to remove such an uncertainty.

To this end, in a step 12, an item of supplementary information relating to the first spatial coordinate of the sound source is determined based on a comparison between respective characteristics of the signals captured by the first and second sensors. As detailed hereinafter, the comparison can be a difference between the phases of the signals captured by the first and second sensors or one of a direction of an acoustic intensity vector of the sound signal, the direction being calculated from the signals captured.

In a step 13, the first spatial coordinate of the sound source is determined, with certainty, based on the expression and supplementary information. Thus, the method according to the invention makes it possible to remove the uncertainty in the first spatial coordinate by the use of an item of supplementary information determined from a comparison between respective characteristics of the signals captured by the first and second sensors. The accuracy of the localization of the sound source is thus improved. Examples of methods according to the invention will be detailed hereinafter, with reference to FIGS. 5 and 7.

Figure 2:
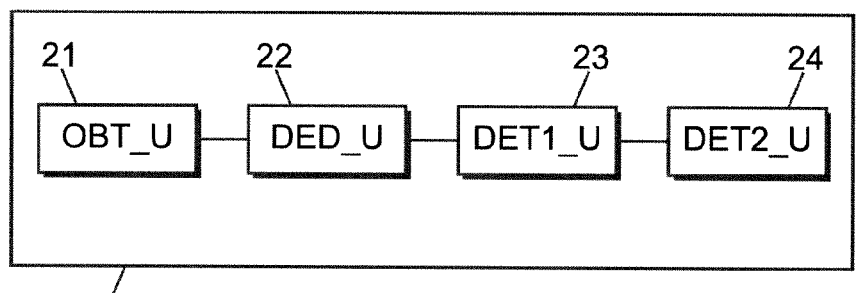
FIG. 2 represents a general structure of a data processing device according to an embodiment.

FIG. 2 shows a general structure of a data processing device 20 according to an embodiment of the invention.

The device 20 comprises a unit 21 for obtaining at least one first signal and one second signal from sound signals captured according to different directivities by a first sensor and a second sensor, as well as a deduction unit 22 for deducing from the first and second signals an expression of at least one first spatial coordinate of the sound source, the expression containing an uncertainty in the spatial coordinate.

The device 20 comprises moreover a first unit 23 for determining an item of supplementary information relating to the first spatial coordinate of the sound source, from a comparison between respective characteristics of the signals captured by the first and second sensors as well as a second unit 24 for determining the first spatial coordinate of the sound source based on the expression and supplementary information.

Figure 3:
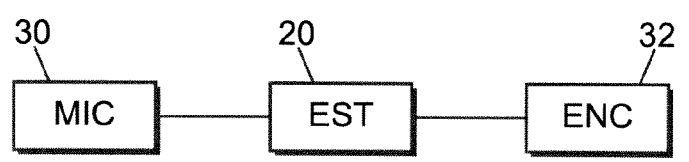
FIG. 3 shows a system for the acquisition and processing of data according to an embodiment of the present invention.

FIG. 3 shows a system for the acquisition of sound signals according to an embodiment of the invention.

The system comprises a microphonic unit 30 suitable for capturing sound signals. As detailed hereinafter, the microphonic unit 30 can take various forms and comprise several sensors such as cardioid and/or bidirectional microphones, or an ambisonic microphone. No restriction is attached to the microphonic unit 30 in question.

The acquisition system comprises moreover the data processing device 20 described above. Hereinafter, it will be assumed that there is only a single sound source at each moment and per frequency band in question. Thus, the processing by the device 20 is carried out over time windows the size of which is determined as a function of the shift of the sensors and as a function of a number of desired frequency samples. According to the invention, it is also possible to add zeros ("zeropadding") as a function of a desired spectral discretization.

The acquisition system comprises moreover an encoding unit 32. Based on the directions of the sound sources determined by means of the data processing device 20, the encoding unit 32 can spatialize virtual sources according to the type of spatial encoding of a specific reproduction technology. For example, in the case of a binaural rendering using a helmet or loudspeakers, the directions of the sources determine the HRTFs to use for spatializing the sounds, with a possibility of personalized choice of the HRTFs for the listener. Still in the case of a binaural rendering using a helmet or loudspeakers, the correction of the position relating to the head is possible by means of the use of a system of following the movements of the head ("head tracking"). In another mode of reproduction, the encoding unit 32 synthesizes ambisonic signals at the different orders for broadcasting using a helmet or an ad hoc set of loudspeakers the positions of which are known.

Figure 4:
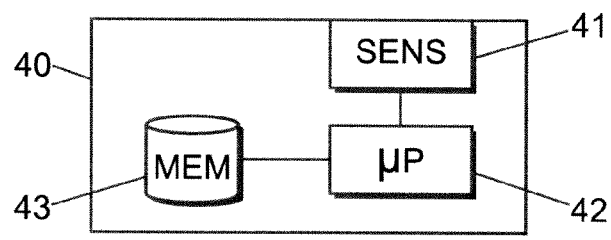
FIG. 4 shows a telecommunications terminal according to an embodiment of the invention.

FIG. 4 shows a telecommunications terminal 40 according to an embodiment of the invention. The telecommunications terminal 40 can be a mobile telephone (of the smart phone type for example), a PDA ("Personal Digital Assistant") or also a touch pad for example. The telecommunications terminal can incorporate the system described in FIG. 3, and comprises to this end a set of sensors 41, corresponding to the microphonic unit 30, a microprocessor 42 and a memory 43.

The memory is suitable for storing a computer program comprising program code instructions allowing the execution of the steps of the method according to the invention by the microprocessor 42. The microprocessor can thus implement the functionalities of the device 20, and optionally of the encoding unit 32.

Figure 5:
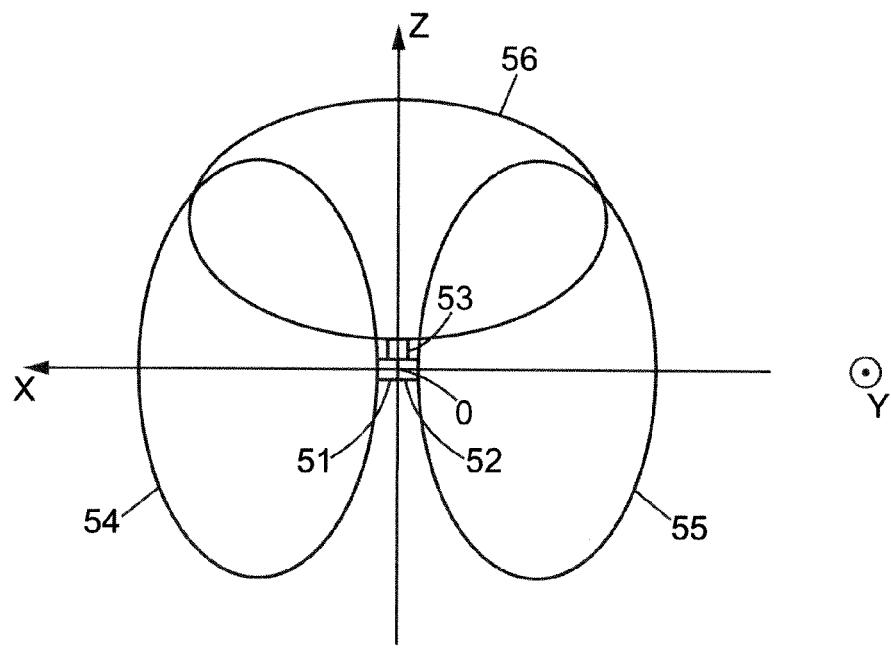
FIG. 5 shows a microphonic unit according to an embodiment of the invention.

FIG. 5 shows a microphonic unit 30 according to a first embodiment of the invention. The microphonic unit 30 comprises three sensors which are cardioid microphones 51, 52 and 53.

The three microphones 51, 52 and 53 are shown in a plane x, z comprising the origin O of space, oriented by an orthonormal frame of reference comprising the three axes x, y and z.

The first cardioid microphone 51 is directed along the x-axis towards increasing values while the second cardioid microphone 52 is directed towards decreasing values of x. The third microphone 53 is directed along the z-axis towards increasing values. The respective directivities of the microphones 51, 52 and 53, as a function of the pointing directions, are shown by the cardioids 54, 55 and 56 viewed in the plane (x, z).

Indeed, the directivity function M of a cardioid microphone is expressed by the relationship:

$$M(\alpha) = \frac{1}{2}(1 + \alpha) \quad (1)$$

$$\text{with } \alpha = \vec{d}_s \cdot \vec{d}_p \quad (2)$$

where $\vec{d}_s$ is a vector defining the direction of the sound source and $\vec{d}_p$ the vector determining the pointing direction of the microphone.

In the example in FIG. 4, respective pointing directions $\vec{d}_{p1}$, $\vec{d}_{p2}$ and $\vec{d}_{p3}$ of the three microphones 51, 52 and 53 can be expressed on the basis of Cartesian coordinates $B_C$:

$$\vec{d}_{p1} = \begin{vmatrix} 1 \\ 0 \\ 0 \end{vmatrix}_{B_C}, \vec{d}_{p2} = \begin{vmatrix} -1 \\ 0 \\ 0 \end{vmatrix}_{B_C}, \vec{d}_{p3} = \begin{vmatrix} 0 \\ 0 \\ 1 \end{vmatrix}_{B_C} \quad (3)$$

Assuming that the direction of the sound source is expressed on the basis of spherical coordinates $B_S$ or the basis of Cartesian coordinates $B_C$:

$$\vec{d}_s = \begin{vmatrix} \theta \\ \phi \\ r \end{vmatrix}_{B_C} = \begin{vmatrix} r \cdot \cos\phi\cos\theta \\ r \cdot \cos\phi\sin\theta \\ r \cdot \sin\phi \end{vmatrix}_{B_S} \quad (4)$$

where the spherical coordinates are defined by the radius r, the azimuth angle $\theta$ and the angle of elevation $\phi$.

Directivity functions for the three microphones 51, 52 and 53 can then be expressed as follows:

$$M_{card1}(\theta, \phi) = \frac{1}{2}(1 + r \cdot \cos\phi\cos\theta) \quad A \quad (5)$$

$$M_{card2}(\theta, \phi) = \frac{1}{2}(1 - r \cdot \cos\phi\cos\theta) \quad B$$

$$M_{card3}(\theta, \phi) = \frac{1}{2}(1 + r \cdot \sin\phi) \quad C$$

In the interests of simplification, it is assumed hereinafter that r=1, which does not change the pointing direction.

Figure 6:
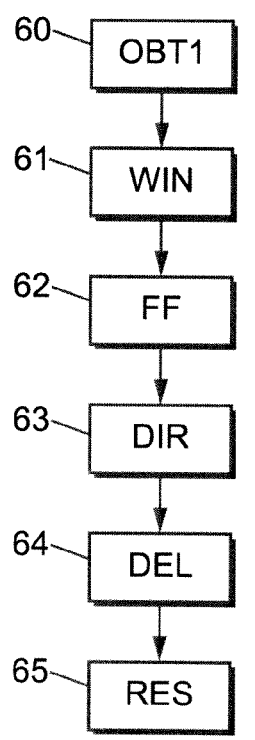
FIG. 6 shows the steps of the method according to an embodiment of the invention for signals captured by the microphonic unit of FIG. 4.

FIG. 6 shows a first particular embodiment of a method according to the invention, implemented when the microphonic unit 30 is the unit represented in FIG. 5.

The sound source the direction of which is indicated by the vector $\vec{d}_s$ induces a signal $s_0(t)$ at the origin O of the frame of reference. Assuming ideally that the microphones 51, 52 and 53 are placed at the origin O, the signals $s_{card1}(t)$, $s_{card2}(t)$ and $s_{card3}(t)$ captured respectively by the microphones 51, 52 and 53 are:

$$s_{card1}(t) = M_{card1}(\theta,\phi)s_0(t) \quad A$$

$$s_{card2}(t) = M_{card2}(\theta,\phi)s_0(t) \quad B$$

$$s_{card3}(t) = M_{card3}(\theta,\phi)s_0(t) \quad C \quad (6)$$

In a step 60, first, second and third signals are obtained by the obtention unit 21 from the signals $s_{card1}(t)$, $s_{card2}(t)$ and $s_{card3}(t)$ captured respectively by the microphones 51, 52 and 53. In this example, the first, second and third signals are equal to the signals $s_{card1}(t)$, $s_{card2}(t)$ and $s_{card3}(t)$ respectively.

In a step 61, the obtention unit can apply a windowing to the first, second and third signals. Preferably, and in order to minimize the oscillations in the frequency field, a time frame is windowed by a smooth transition window.

In a step 62, the obtention unit 21 applies a Fourier transform to the first, second and third signals. Thus, the operations described hereinafter take place in the frequency field, frequency by frequency.

Hereinafter, certain expressions are also given in the time field: as the Fourier transform is linear, these expressions would be similar in the frequency field (subject to similar notational conventions, and replacing t by a pulse). From the directivity relationships 6A, 6B and 6C, the deduction unit 22 can deduce in a step 63 the following expressions for the sound signal $s_0(t)$ generated by the sound source at the origin O and for the spatial coordinates $\theta$ and ($\phi$):

$$s_0(t) = s_{card1}(t,\theta,\phi) + s_{card2}(t,\theta,\phi) \quad (7) \text{ (by combining 5A, 5B and 6)}$$

$$\phi = \sin^{-1}\left[2\frac{s_{card3}(t, \theta, \phi)}{s_0(t, \theta, \phi)} - 1\right] \quad (8)$$

(by combining 5C and 6)

$$\theta = \cos^{-1}\left[\frac{s_{card1}^2(t, \theta, \phi) - s_{card2}^2(t, \theta, \phi)}{s_0(t)^2 \cdot \cos\phi}\right] \quad (9)$$

(by combining 5A and 5B)

Thus expressions of the spatial coordinates $\theta$ and $\phi$ are obtained only based on the directivity of the microphones 51, 52 and 53 (the signals captured respectively by these microphones).

The expression of the azimuth coordinate $\theta$ however takes the form of an inverse cosine, and the azimuth coordinate $\theta$ is thus determined with an uncertainty of $\pm\pi/2$.

The present invention makes it possible to remove such an uncertainty, utilizing an item of supplementary information as described above. The supplementary information is determined by the first determination unit 23 in a step 64.

In the example shown in FIGS. 5 and 6, the supplementary information is the sign of a difference between the respective phases (or delay) of the first and second signals.

In fact, a shift between respective positions of the microphones 51 and 52, perpendicular to the pointing direction of these microphones and in the plane (x, y) (therefore along the y-axis) is introduced according to the invention.

The signal $s_{card1}$ captured by the first microphone 51 shifted to the Cartesian coordinates ($x_1,y_1,z_1$) is described by:

$$s_{card1}(t) = M_{card1}(\theta,\phi)s_0(t-\tau_1) \quad (10)$$

where $\tau_1$ represents the path difference caused by the distance between the microphone 51 and the origin O, and which can be expressed by the relationship:

$$\tau_1 = \frac{1}{c}\vec{d}_s \cdot \vec{E}_1 \quad (11)$$

where c is the speed of the sound waves and $\vec{E}_1$ is a vector determining the location of the microphone 51 in Cartesian coordinates on the basis of $B_C$:

$$\vec{E}_1 = \begin{vmatrix} x_1 \\ y_1 \\ z_1 \end{vmatrix}_{B_C} \quad (12)$$

assuming that the direction $\vec{d}_s$ of the sound source is expressed on the spherical basis of $B_S$ or on the Cartesian basis of $B_C$:

$$\vec{d}_s = \begin{vmatrix} \theta \\ \phi = \\ B_C \quad r \quad B_S \end{vmatrix} \begin{vmatrix} r \cdot \cos\phi\cos\theta \\ r \cdot \cos\phi\sin\theta \\ r \cdot \sin\phi \end{vmatrix}$$

and therefore:

$$\tau_1 = \frac{1}{c}(x_1 r \cdot \cos\phi\cos\theta + y_1 r \cdot \cos\phi\sin\theta + z_1 r \cdot \sin\phi) \quad (13)$$

Similarly, the following is obtained for the second microphone 52:

$$s_{card2}(t) = M_{card2}(\theta, \phi) s_0(t - \tau_2) \quad (14)$$

with $$\tau_2 = \frac{1}{c}(x_2 r \cdot \cos\phi\cos\theta + y_2 r \cdot \cos\phi\sin\theta + z_2 r \cdot \sin\phi) \quad (15)$$

In the frequency field, the signals $s_{card1}(t)$ and $s_{card2}(t)$ become $s_{card1}(\omega)$ and $s_{card2}(\omega)$, where $\omega=2\pi f$ denotes the pulse, f being the frequency associated with the sound signal emitted by the sound source.

Hereinafter, the Fourier transform is denoted FT[ ].

$$FT[s_{card1}(t,\theta,\phi)] = S_{card1}(\omega,\theta,\phi) = M_{card1}(\theta,\phi)S_0(\omega)e^{-j\omega\tau_1} \quad (16)$$

$$FT[s_{card2}(t,\theta,\phi)] = S_{card2}(\omega,\theta,\phi) = M_{card2}(\theta,\phi)S_0(\omega)e^{-j\omega\tau_2} \quad (17)$$

where $S_0(\omega)=|S_0(\omega)|e^{j\angle S_0(\omega)}$, '$\angle$' denoting the phase of the sound signal at the origin O.

Therefore:

$$S_{card1}(\omega,\theta,\phi) = M_{card1}(\theta,\phi)|S_0(\omega)|e^{j(\angle S_0(\omega)-\omega\tau_1)} \quad (18)$$

$$S_{card2}(\omega,\theta,\phi) = M_{card2}(\theta,\phi)|S_0(\omega)|e^{j(\angle S_0(\omega)-\omega\tau_2)} \quad (19)$$

By noting $\angle S_1(\omega)=\angle S_0(\omega)-\omega\tau_1$ (20)

and $\angle S_2(\omega)=\angle S_0(\omega)-\omega\tau_2$ (21)

The following is obtained: $\angle S_1 - \angle S_2 = -\omega(\tau_1-\tau_2)$ (22)

By noting $\tau_{12}=\tau_1-\tau_2$ the time delay between the signals captured by the microphones 51 and 52, is obtained:

$$\tau_{12}(\omega) = -\frac{1}{\omega}(\angle S_1 - \angle S_2) \quad (23)$$

In a step 65, the second determination unit 24 determines the spatial coordinate θ based on the supplementary information (sign of the delay or phase difference between the signals captured respectively by the microphones 51 and 52) and the expression for θ containing an uncertainty (expression (9)).

As the time delay $\tau_{12}$ is only used to remove the uncertainty introduced by the expression of the azimuth coordinate θ (expression (9)), only the sign of the time delay $\tau_{12}$ is used, by introducing it directly into the expression (9):

$$\theta = \frac{\tau_{12}(\omega)}{|\tau_{12}(\omega)|}\cos^{-1}\left[\frac{S_{card1}^2(\omega,\theta,\phi) - S_{card2}^2(\omega,\theta,\phi)}{S_0(\omega)^2 \cdot \cos\phi}\right] \quad (24)$$

Figure 7A:
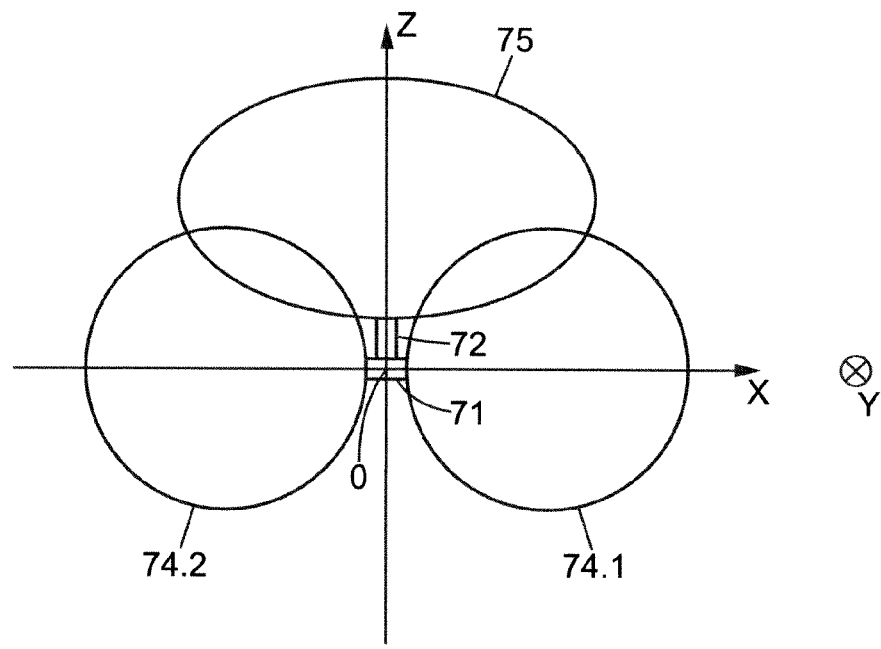
FIGS. 7a and 7b show a microphonic unit according to another embodiment of the invention.
Figure 7B:
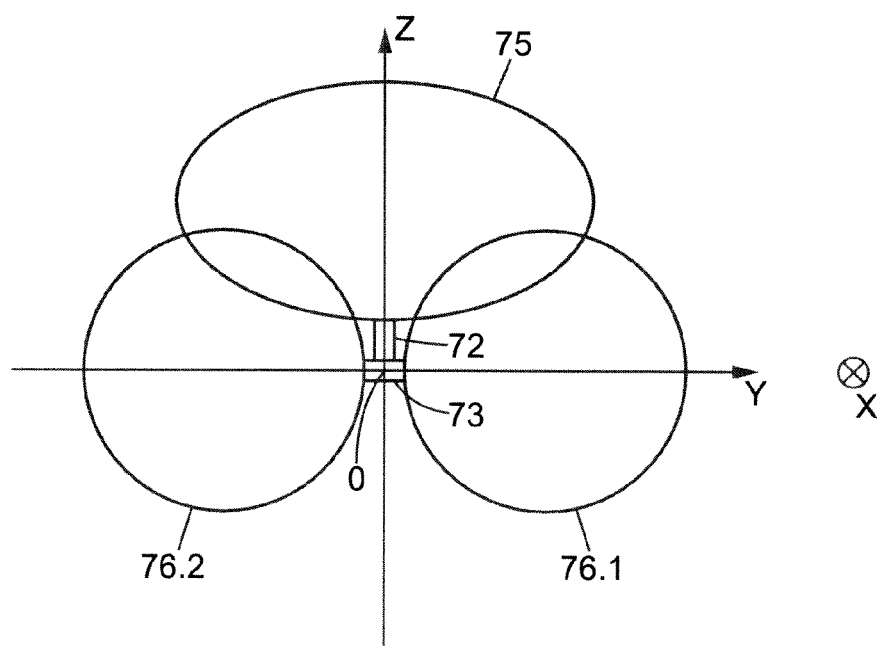

FIGS. 7a and 7b show a microphonic unit 30 according to a second embodiment of the invention. The microphonic unit 30 comprises three sensors, namely a first bidirectional microphone 71, a second bidirectional microphone 73 and a cardioid microphone 72. By bidirectional microphone is meant a pressure-gradient microphone.

The first bidirectional microphone 71 is placed on the x-axis (see FIG. 7a), the second bidirectional microphone 73 is placed on the y-axis (see FIG. 7b) and the cardioid microphone 72 is oriented on the z-axis towards the increasing values (see FIGS. 7a and 7b).

The directivity, as a function of the pointing directions, of the first bidirectional microphone 71 is represented in the form of two spheres oriented towards the positive x values and negative x values and shown in the plane (x, z) under references 74.1 and 74.2 in FIG. 7a, respectively.

The directivity, as a function of the pointing directions, of the second bidirectional microphone 73 is represented in the form of two spheres oriented towards the positive y values and negative y values and shown in the plane (y, z) under references 76.1 and 76.2 in FIG. 7b, respectively.

The directivity of the cardioid microphone 72, as a function of the pointing directions, is shown by a cardioid microphone 75 viewed in the plane (x, z) in FIG. 7a and in the plane (y, z) in FIG. 7b.

Figure 8:
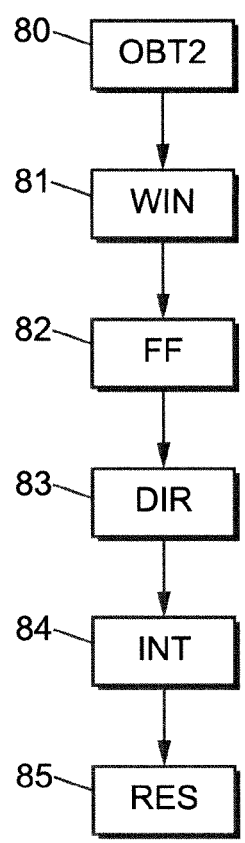
FIG. 8 shows the steps of the method according to an embodiment of the invention for signals captured by the microphonic unit of FIGS. 7a and 7b.

FIG. 8 shows a second particular embodiment of a method according to the invention, implemented when the microphonic unit 30 is the unit represented in FIGS. 7a and 7b.

The microphonic unit 30 thus makes it possible to obtain signals originating from a pair of bidirectional microphones 71 and 73 placed perpendicularly in the horizontal plane (x, y). The invention then proposes to reconstruct virtually the signals captured by the cardioid microphones 51 and 52 in FIG. 5 in order to obtain first and second signals comparable to those obtained in step 50 in FIG. 5.

To this end, in a step 80, the obtention unit 21 determines first and second signals based on the sound signal $s_{bi1}$ captured by the first bidirectional microphone 71 and on the sound signal $s_{bi2}$ captured by the second bidirectional microphone 73.

The expressions of the signals $s_{bi1}$ and $s_{bi2}$, and of the signal $s_{card3}$ captured by the cardioid microphone 72, are given by the following formulae:

$$s_{bi1}(t, \theta, \phi) = s_0(t)\cos\theta\cos\phi \quad A \quad (25)$$

$$s_{bi2}(t, \theta, \phi) = s_0(t)\sin\theta\cos\phi \quad B$$

$$s_{card3}(t, \theta, \phi) = \frac{s_0(t)}{2}(1 + \sin\phi) \quad C$$

The first signal $s_{cardvirt1}$ and the second signal $s_{cardvirt2}$ which would have been captured by two cardioid microphones are reconstructed as follows:

$$s_{cardvirt1}(t, \theta, \phi) = \frac{s_0(t)}{2}\left(1 + \frac{s_{bi2}(t, \theta, \phi)}{s_0(t)}\right) \quad (26)$$

$$s_{cardvirt2}(t, \theta, \phi) = \frac{s_0(t)}{2}\left(1 - \frac{s_{bi2}(t, \theta, \phi)}{s_0(t)}\right) \quad (27)$$

with $$s_0(t) = \frac{s_{bi1}^2(t, \theta, \phi) + s_{bi2}^2(t, \theta, \phi) + 4s_{card3}^2(t, \theta, \phi)}{4s_{card3}(t, \theta, \phi)} \quad (28)$$

The obtention unit 21 thus obtains first, second and third signals $s_{cardvirt1}$, $s_{cardvirt2}$ and $s_{card3}$.

In a step 81, the obtention unit 21 can apply a windowing to the first, second and third signals. As explained above, in order to minimize the oscillations in the frequency field, a time frame is windowed by a smooth transition window.

In a step 82, the obtention unit 21 applies a Fourier transform to the first, second and third signals. Thus, the operations described hereinafter take place in the frequency field, frequency by frequency. Again, certain expressions are also given in the time field: as the Fourier transform is linear, they would be similar in the frequency field.

In a step 83, the deduction unit 22 can deduce from the first, second and third signals the following expressions for the spatial coordinates θ and (I):

$$\phi = \sin^{-1}\left[2\frac{s_{card3}(t,\theta,\phi)}{s_O(t,\theta,\phi)} - 1\right] \quad (29)$$

$$\theta = \cos^{-1}\left[\frac{s^2_{cardvirt1}(t,\theta,\phi) - s^2_{cardvirt2}(t,\theta,\phi)}{s_0(t)^2 \cdot \cos\phi}\right] \quad (30)$$

Again, the expression of the spatial coordinate θ shows an uncertainty due to the inverse cosine function. In such a virtual configuration, the aforementioned uncertainty cannot be removed by introducing a delay between the bidirectional microphones 71 and 73.

However, an item of supplementary information relating to a direction of an acoustic intensity vector of the sound signal, the direction being calculated from the signals captured by the first and second bidirectional microphones 71 and 73, can be determined by the first determination unit 23, in order to remove the uncertainty in the expression (30).

The active acoustic intensity is a vector linked to the pressure and the particle velocity by the following relationship, given in the frequency field:

$$I(\omega) = \begin{vmatrix} I_x(\omega) \\ I_y(\omega) \\ I_z(\omega) \end{vmatrix} = \frac{1}{2}\text{Re}\left\{ P^*(\omega) \begin{pmatrix} V_x(\omega) \\ V_y(\omega) \\ V_z(\omega) \end{pmatrix} \right\} \quad (31)$$

where $P^*(\omega)$ corresponds to the conjugate of the acoustic pressure and the three signals $V_x(\omega)$, $V_y(\omega)$ and $V_z(\omega)$ represent the three components of the particle velocity vector.

Consideration will now be given to the case of a progressive plane wave the pressure of which is described by the following relationship (in which k defines the wave vector):

$$P(\omega,r,\theta,\phi) = P_0(\omega)e^{-j\vec{k}\cdot\vec{r}} \quad (32)$$

The particle velocity is deduced from the Euler relationship:

$$\vec{V}(\omega, r, \theta, \phi) = \frac{P(\omega, r, \theta, \phi)}{\rho c} \frac{\vec{k}}{|\vec{k}|} \quad (33)$$

where ρ is the density of the propagation medium and c the speed of the sound waves.

Therefore, the sound intensity is given by:

$$I(\omega) = \begin{vmatrix} I_x(\omega) = \frac{|P_0(\omega)|^2}{2\rho c}\frac{k_x}{|\vec{k}|} \\ I_y(\omega) = \frac{|P_0(\omega)|^2}{2\rho c}\frac{k_y}{|\vec{k}|} \\ I_z(\omega) = \frac{|P_0(\omega)|^2}{2\rho c}\frac{k_z}{|\vec{k}|} \end{vmatrix} \quad (34)$$

The intensity vector I(ω) is collinear with the wave vector, i.e. its direction is identical to the direction of propagation of the sound signal. The direction of the intensity vector I(ω) thus makes it possible to reach an estimation of the direction of the sound source.

The projection $V_{xy}$ on the horizontal plane (x, y) of the particle velocity is expressed by:

$$V_{xy}(\omega) = \frac{1}{\rho c}[X(\omega)\vec{e}_x + Y(\omega)\vec{e}_y] \quad (35)$$

where X and Y are the signals captured by the bidirectional microphones 71 and 73, respectively.

The signals associated with the pressure and with the components of the particle velocity are obtained by the relationship:

$$P_0(\omega) = s_0(\omega)$$

$$X(\omega) = s_{bi1}(\omega)$$

$$Y(\omega) = s_{bi2}(\omega)$$

The components of the sound intensity in the plane (x, y) are derived therefrom as follows:

$$I_x(\omega) = \frac{1}{2\rho c}\text{Re}[S_0^*(\omega)S_{bi1}(\omega)] \quad (36)$$

$$I_y(\omega) = \frac{1}{2\rho c}\text{Re}[S_0^*(\omega)S_{bi2}(\omega)] \quad (37)$$

As the intensity vector is collinear with the wave vector, the inverse tangent of the ratio between the components of the sound intensity of the expressions (36) and (37) gives an estimation of the spatial coordinate θ and therefore:

$$\theta(\omega) = \tan^{-1}\left(\frac{I_y(\omega)}{I_x(\omega)}\right) \quad (38)$$

The supplementary information $$\frac{I_y(\omega)}{I_x(\omega)}$$

is linked to the spatial coordinate θ by an inverse tangent function which introduces a right-left uncertainty, which is complementary to the uncertainty due to the inverse cosine in the expression (30).

The second determination unit can then, in a step 85, utilize both the supplementary information and the expression (30) in order to determine with certainty the spatial coordinate θ.

To this end, Table 1 below shows how to remove the uncertainty in the spatial coordinate θ.

TABLE 1

| | | estimated θ | | operation to be carried out | |
|---|---|---|---|---|---|
| | actual θ | directivity | intensity | directivity | intensity |
| Case | $[-\pi, -\frac{\pi}{2}]$ | $[\frac{\pi}{2}, \pi]$ | $[0, \frac{\pi}{2}]$ | $-\theta$ | $\theta - \pi$ |
| | $[-\frac{\pi}{2}, 0]$ | $[0, \frac{\pi}{2}]$ | $[-\frac{\pi}{2}, 0]$ | $-\theta$ | $\theta$ |
| | $[0, \frac{\pi}{2}]$ | $[0, \frac{\pi}{2}]$ | $[0, \frac{\pi}{2}]$ | $\theta$ | $\theta$ |
| | $[\frac{\pi}{2}, \pi]$ | $[\frac{\pi}{2}, \pi]$ | $[-\frac{\pi}{2}, 0]$ | $\theta$ | $\theta + \pi$ |

Columns 2 and 3 of Table 1 (summarized under "estimated θ") describe the different scenarios after steps 83 and 84, respectively. The actual value of the spatial coordinate θ is given in the first column ("actual θ").

The operations to be applied to the values of the spatial coordinate θ estimated at the end of steps 83 and 84 are described in columns 4 and 5 (summarized under "Operation to be carried out"). Theoretically, the spatial coordinates θ obtained by carrying out the operations of columns 4 and 5 are the same. However, in practice, due to the sound scene to be studied and the recording conditions (number of sources, noise level, complexity, etc), the application of one or other of the operations described in columns 4 and 5 can give a better estimation of the spatial coordinate θ and is therefore preferred.

According to a third specific embodiment of the invention, the microphonic unit 30 can be a first-order ambisonic microphone, such as the microphone described in the U.S. Pat. No. 4,042,779 introduced above. More generally, the microphonic unit can be any ambisonic microphone of order greater than one.

An ambisonic microphone of the first order, or of order greater than one more generally, is suitable for delivering four signals $b_{00}^1(t)$, $b_{11}^1(t)$, $b_{11}^{-1}(t)$ and $b_{10}^1(t)$ (in the time field). The signal $b_{00}^1(t)$ represents the pressure signal, while the signals $b_{11}^1(t)$, $b_{11}^{-1}(t)$ and $b_{10}^1(t)$ correspond to three bidirectional microphones along the axes x, y and z respectively.

As in the second embodiment shown above, the signals captured by the microphonic unit 30 are used by the obtention unit 30 in order to synthesize a virtual microphonic device by deducing the first, second and third signals corresponding to three virtual cardioid microphones.

The first, second and third signals, denoted respectively $s_{cardvirt1}$, $s_{cardvirt2}$ and $s_{cardvirt3}$ are obtained by the obtention unit 21 from the first-order ambisonic signals as follows:

$$s_{cardvirt1}(t, \theta, \phi) = \frac{b_{00}^1(t)}{2}\left(1 + \frac{b_{11}^{-1}(t)}{b_{00}^1(t)}\right) \quad (39)$$

$$s_{cardvirt2}(t, \theta, \phi) = \frac{b_{00}^1(t)}{2}\left(1 - \frac{b_{11}^{-1}(t)}{b_{00}^1(t)}\right) \quad (40)$$

$$s_{cardvirt3}(t, \theta, \phi) = \frac{b_{00}^1(t)}{2}\left(1 + \frac{b_{10}^1(t)}{b_{00}^1(t)}\right) \quad (41)$$

As explained above, the obtention unit 21 can window the first, second and third signals and apply a Fourier transform to them in order to move to the frequency field.

The following expressions for the sound signal $s_0(t)$ generated by the sound source at the origin O and for the spatial coordinates θ and ϕ are then obtained by the deduction unit 22:

$$s_0(t) = b_{00}^1(t) \quad (42)$$

$$\phi = \sin^{-1}\left[2\frac{s_{virtcard3}(t, \theta, \phi)}{s_0(t, \theta, \phi)} - 1\right] \quad (43)$$

$$\theta = \cos^{-1}\left[\frac{s_{virtcard1}^2(t, \theta, \phi) - s_{virtcard2}^2(t, \theta, \phi)}{s_0(t)^2 \cdot \cos\phi}\right] \quad (44)$$

Again, the expression (44) of the spatial coordinate θ shows an uncertainty. As in the second embodiment given above, this uncertainty can be removed by utilizing the supplementary information linked to the sound intensity derived from the B-format signals.

To this end, the first determination unit 23 determines the supplementary information linked to the sound intensity derived from the B-format signals.

The three components of the sound intensity are calculated as follows:

$$I_x(\omega) = \frac{1}{2\rho c}\text{Re}[B_{00}^{1*}(\omega)B_{11}^1(\omega)] \quad (45)$$

$$I_y(\omega) = \frac{1}{2\rho c}\text{Re}[B_{00}^{1*}(\omega)B_{11}^{-1}(\omega)] \quad (46)$$

$$I_z(\omega) = \frac{1}{2\rho c}\text{Re}[B_{00}^{1*}(\omega)B_{01}^1(\omega)] \quad (47)$$

It is then possible to determine the direction of the sound source (spatial coordinates θ and ϕ) by means of the following relationships:

$$\theta(\omega) = \tan^{-1}\left(\frac{I_y(\omega)}{I_x(\omega)}\right) \quad (48)$$

$$\phi(\omega) = \tan^{-1}\left(\frac{I_z(\omega)}{\sqrt{I_x^2(\omega) + I_y^2(\omega)}}\right) \quad (49)$$

Thus, as in the second embodiment, the second determination unit 24 can utilize the expression (44) and the supplementary information of the expression (48) in order to determine the spatial coordinate θ. To this end, Table 1 detailed above can be used.

It is noted moreover that in this third embodiment, the spatial elevation coordinate ϕ is determined both by the expression (43) and by the expression (49). Thus, as for the spatial coordinate θ, it is possible to prefer one or other of the estimation methods depending on the sound scene to be studied (number of sources, noise level, complexity, etc) in order to obtain a best localization of the sound source.

According to a fourth specific embodiment of the invention, the microphonic unit 30 can comprise only two sensors, which are cardioid microphones (for example only the microphones 51 and 52 in FIG. 5).

Thus, a first cardioid microphone is directed along the x-axis towards positive values and the second cardioid microphone is directed along the x-axis towards negative values.

The directivities of the first and second cardioid microphones are given by the expressions (5A) and (5B), and the signals captured by these two microphones (which, as in the first embodiment, are also the first and second signals obtained by the obtention unit 21) are given by the expressions (6A) and (6B). In order to determine the azimuth spatial coordinate θ, the expression (9) is used by fixing the elevation spatial coordinate φ at an arbitrary value φ₀. Preferably, the elevation spatial coordinate φ is fixed as close as possible to the horizontal plane (low value of φ), in order to minimize the localization error.

The uncertainty in the spatial azimuth coordinate θ due to the expression (9) is resolved by shifting the first and second cardioid microphones on the y-axis so as to introduce a delay in the same way as in the first embodiment. The supplementary information of the expression (23) is then used in order to obtain the expression (24) of the azimuth spatial coordinate θ, by fixing φ at φ₀.

According to a fifth specific embodiment of the invention, the microphonic unit 30 can comprise only two sensors, which are bidirectional microphones (for example only the microphones 71 and 73 in FIGS. 7a and 7b).

In this fifth embodiment, a virtual microphonic device is synthesized by the obtention unit 21 so as to obtain first and second signals from the signals captured by the bidirectional microphones (expressions (25A) and (25B)), the first and second signals being in the form of signals captured by cardioid microphones (expressions (26) and (27)).

As for the expression (28), it is approximated by the following expression:

$$s_0(t) = s_{bi1}^2(t,\theta,\phi) + s_{bi2}^2(t,\theta,\phi) \quad (50)$$

By way of illustration, five embodiments were mentioned above. Of course, the present invention is not limited to these examples and extends to other variants, depending in particular on the sensors of the microphonic unit 30.

The results from the five embodiments presented above make it possible to obtain estimations at each moment and for each frequency band of at least the spatial coordinate θ. In order to avoid sudden skips of the sound sources due to localization errors, it is possible to smooth the results obtained in the frequency field and in the time field.

The invention claimed is:

1. A data processing method for determining at least one spatial coordinate of a sound source emitting a sound signal, in a three-dimensional space, the method comprising the following steps:
    obtaining at least one first signal and one second signal from the sound signal captured according to different directivities by a first sensor and a second sensor;
    deducing from the first and second signals an expression of at least one first spatial coordinate of the sound source, said expression containing an uncertainty;
    determining an item of supplementary information relating to the first spatial coordinate of the sound source, based on a comparison between the respective characteristics of the signals captured by the first and second sensors, wherein the item of supplementary information is determined based on a direction of an intensity vector, the direction being calculated from the first and second signals;
    determining said first spatial coordinate of the sound source based on the expression and supplementary information.

2. The method according to claim 1, wherein, the space being oriented according to three axes x, y and z, the first and second sensors are cardioid microphones, the first cardioid microphone being situated at a first position of the space and oriented along the x-axis in a direction along which x increases and the second cardioid microphone being situated at a second position of the space and oriented along the x-axis in a direction along which x decreases, the method initially comprising:
    modifying the first or the second position so as to introduce a shift along the y-axis between the first cardioid microphone and the second cardioid microphone, wherein the first and second signals correspond to the signals captured respectively by the first and second cardioid microphones, and wherein the supplementary information is the sign of a difference between respective phases of the first and second signals.

3. The method according to claim 2, wherein a third signal $s_{card3}$ captured by a third cardioid microphone oriented along the z-axis in a direction along which z increases is obtained, wherein first and second spatial coordinates of the sound source are respectively the spherical coordinates of azimuth θ and of elevation φ and wherein, the first signal captured by the first cardioid microphone being denoted $s_{card1}$ and the second signal captured by the second cardioid microphone being denoted $s_{card2}$, the expressions of the spherical coordinates of azimuth θ and of elevation φ are given by:

$$s_0(t) = s_{card1}(t,\theta,\phi) + s_{card2}(t,\theta,\phi)$$

$$\phi = \sin^{-1}\left[2\frac{s_{card3}(t,\theta,\phi)}{s_0(t,\theta,\phi)} - 1\right]$$

$$\theta = \cos^{-1}\left[\frac{s_{card1}^2(t,\theta,\phi) - s_{card2}^2(t,\theta,\phi)}{s_0(t)^2 \cdot \cos\phi}\right]$$

where t is time, and wherein the sign of the azimuth spherical coordinate θ is given by the phase difference between the first and second signals.

4. The method according to claim 2, wherein first and second spatial coordinates of the sound source are respectively the spherical coordinates of azimuth θ and of elevation φ, wherein, the first signal captured by the first cardioid microphone being denoted $s_{card1}$ and the second signal captured by the second cardioid microphone being denoted $s_{card2}$, the expression of the azimuth spherical coordinate θ is given by:

$$s_0(t) = s_{card1}(t,\theta,\phi) + s_{card2}(t,\theta,\phi)$$

$$\theta = \cos^{-1}\left[\frac{s_{card1}^2(t,\theta,\phi) - s_{card2}^2(t,\theta,\phi)}{s_0(t)^2 \cdot \cos\phi}\right]$$

where t is time, wherein the elevation spherical coordinate φ is fixed arbitrarily and wherein the sign of the azimuth spherical coordinate θ is given by the phase difference between the first and second signals.

5. The method according to claim 1, wherein, the space being oriented according to three axes x, y and z, first and second spatial coordinates of the sound source are the spherical coordinates of azimuth θ and of elevation φ, the first and second sensors are bidirectional sensors, said first sensor being oriented along the x-axis and capturing the signal denoted $s_{bi1}$ and said second sensor being oriented along the y-axis and capturing the signal denoted $s_{bi2}$, wherein a third cardioid sensor is directed along the increasing z-axis and suitable for capturing a signal denoted $s_{card3}$, wherein the first and second signals are denoted respectively $s_{cardvirt1}$ and $s_{cardvirt2}$ and are obtained by:

$$s_0(t) = s_{card1}(t, \theta, \phi) + s_{card2}(t, \theta, \phi)$$

$$s_{cardvirt1}(t, \theta, \phi) = \frac{s_0(t)}{2}\left(1 + \frac{s_{bi2}(t, \theta, \phi)}{s_0(t)}\right);$$

$$s_{cardvirt2}(t, \theta, \phi) = \frac{s_0(t)}{2}\left(1 - \frac{s_{bi2}(t, \theta, \phi)}{s_0(t)}\right);$$

$$\text{with } s_0(t) = \frac{s_{bi1}^2(t, \theta, \phi) + s_{bi2}^2(t, \theta, \phi) + 4s_{card3}^2(t, \theta, \phi)}{4s_{card3}^2(t, \theta, \phi)};$$

wherein the expressions of the spherical coordinates of azimuth $\theta$ and of elevation $\phi$ are given by:

$$\phi = \sin^{-1}\left[2\frac{s_{card3}(t, \theta, \phi)}{s_0(t, \theta, \phi)} - 1\right]$$

$$\theta = \cos^{-1}\left[\frac{s_{cardvirt1}^2(t, \theta, \phi) - s_{cardvirt2}^2(t, \theta, \phi)}{s_0(t)^2 \cdot \cos\phi}\right]$$

where t is time, and wherein the supplementary information is determined from a direction of an acoustic intensity vector of the sound signal, said direction being calculated from the signals $s_{bi1}$ and $s_{bi2}$.

6. The method according to claim 5, in which the supplementary information is a second expression of the azimuth coordinate $\theta$:

$$\theta(\omega) = \tan^{-1}\left(\frac{I_y(\omega)}{I_x(\omega)}\right)$$

$\omega$ being a pulse of the sound signal emitted by the source, $I_y(\omega)$ being the component according to the y-coordinate of the acoustic intensity vector of the sound signal, given by:

$$I_y(\omega) = \frac{1}{2\rho c} Re[S_0^*(\omega) S_{bi1}(\omega)];$$

$I_x(\omega)$ being the component according to the x-coordinate of the acoustic intensity vector of the sound signal given by:

$$I_x(\omega) = \frac{1}{2\rho c} Re[S_0^*(\omega) S_{bi2}(\omega)];$$

$s_0(\omega)$, $s_{bi1}(\omega)$ and $s_{bi2}(\omega)$ denoting the Fourier transforms of the signals $s_0(t)$, $s_{bi}1(t)$ and $s_{bi2}(t)$ respectively; where c is a speed of sound waves, and $\rho$ is a density of a propagation medium.

7. The method according to claim 1, wherein, the space being oriented according to three axes x, y and z, the first and second spatial coordinates are the spherical coordinates of azimuth $\theta$ and of elevation $\phi$, the first and second sensors are bidirectional sensors, said first sensor being oriented along the x-axis and capturing the signal denoted $s_{bi1}$ and said second sensor being oriented along the y-axis and capturing the signal denoted $s_{bi2}$, wherein the first and second signals are denoted respectively $s_{cardvirt1}$ and $s_{cardvirt2}$ and are obtained as follows:

$$s_0(t) = s_{card1}(t, \theta, \phi) + s_{card2}(t, \theta, \phi)$$

$$s_{cardvirt1}(t, \theta, \phi) = \frac{s_0(t)}{2}\left(1 + \frac{s_{bi2}(t, \theta, \phi)}{s_0(t)}\right);$$

$$s_{cardvirt2}(t, \theta, \phi) = \frac{s_0(t)}{2}\left(1 - \frac{s_{bi2}(t, \theta, \phi)}{s_0(t)}\right);$$

$$\text{with } s_0(t) = \sqrt{s_{bi1}^2(t, \theta, \phi) + s_{bi2}^2(t, \theta, \phi)};$$

wherein the expression of the azimuth spherical coordinate $\theta$ is given by:

$$\theta = \cos^{-1}\left[\frac{s_{cardvirt1}^2(t, \theta, \phi) - s_{cardvirt2}^2(t, \theta, \phi)}{s_0(t)^2 \cdot \cos\phi}\right]$$

where t is time;

wherein the elevation spherical coordinate $\phi$ is fixed arbitrarily;

wherein the supplementary information is determined from a direction of an acoustic intensity vector of the sound signal, said direction being calculated from the signals $s_{bi1}$ and $s_{bi2}$.

8. The method according to claim 1, wherein first and second spatial coordinates of the sound source are spherical coordinates of azimuth $\theta$ and of elevation $\phi$, the first and second sensors form part of an ambisonic microphone$_{[M1]}$, wherein the signals originating from the ambisonic microphone are a pressure signal $b_{00}^1(t)$ and three pressure gradient signals $b_{11}^1(t)$, $b_{11}^{-1}(t)$ and $b_{10}^1(t)$;

wherein the first signal, denoted $s_{cardvirt1}$, and the second signal, denoted $d_{cardvirt2}$, and a third signal $s_{cardvirt3}$ are obtained from the signals $b_{00}^1(t)$, $b_{11}^1(t)$, $b_{11}^{-1}(t)$ and $b_{10}^1(t)$ by:

$$s_{cardvirt1}(t, \theta, \phi) = \frac{b_{00}^1(t)}{2}\left(1 + \frac{b_{11}^{-1}(t)}{b_{00}^1(t)}\right);$$

$$s_{cardvirt2}(t, \theta, \phi) = \frac{b_{00}^1(t)}{2}\left(1 - \frac{b_{11}^{-1}(t)}{b_{00}^1(t)}\right);$$

$$s_{cardvirt3}(t, \theta, \phi) = \frac{b_{00}^1(t)}{2}\left(1 + \frac{b_{10}^1(t)}{b_{00}^1(t)}\right);$$

wherein the expressions of the spherical coordinates of azimuth $\theta$ and of elevation $\phi$ are given by:

$$\phi = \sin^{-1}\left[2\frac{s_{cardvirt3}(t, \theta, \phi)}{s_0(t, \theta, \phi)} - 1\right]$$

$$\theta = \cos^{-1}\left[\frac{s_{cardvirt1}^2(t, \theta, \phi) - s_{cardvirt2}^2(t, \theta, \phi)}{s_0(t)^2 \cdot \cos\phi}\right]$$

with $s_0 = b_{00}^1(t)$;

wherein the supplementary information is determined from a direction of an acoustic intensity vector of the sound signal, the direction being calculated from the signals $b_{00}{}^1(t)$, $b_{11}{}^1(t)$ and $b_{11}{}^{-1}(t)$, and where t is time.

9. The method according to claim 8, wherein the supplementary information is a second expression of the azimuth spherical coordinate θ:

$$\theta(\omega) = \tan^{-1}\left(\frac{I_y(\omega)}{I_x(\omega)}\right)$$

ω being a pulse of the sound signal emitted by the source, $I_y(\omega)$ being the component according to the y-coordinate of the acoustic intensity vector of the sound signal and being given by:

$$I_y(\omega) = \frac{1}{2\rho c} Re[B_{00}^{1*}(\omega) B_{11}^{-1}(\omega)]$$

$I_x(\omega)$ being the component according to the x-coordinate of the acoustic intensity vector of the sound signal and being given by:

$$I_x(\omega) = \frac{1}{2\rho c} Re[B_{00}^{1*}(\omega) B_{11}^{1}(\omega)];$$

$B_{00}{}^1(\omega)$, $B_{11}{}^1(\omega)$ and $B_{11}{}^{-1}(\omega)$ denoting the Fourier transforms of the signals $b_{00}{}^1(t)$, $b_{11}{}^1(t)$ and $b_{11}{}^{-1}(t)$ respectively;

where c is a speed of sound waves, and ρ is a density of a propagation medium.

10. The method according to claim 8, wherein a supplementary expression is determined for the elevation spherical coordinate:

$$\phi(\omega) = \tan^{-1}\left(\frac{I_z(\omega)}{\sqrt{I_x^2(\omega) + I_y^2(\omega)}}\right)$$

ω being a pulse of the sound signal emitted by the source, $I_y(\omega)$ being given by:

$$I_y(\omega) = \frac{1}{2\rho c} Re[B_{00}^{1*}(\omega) B_{11}^{-1}(\omega)];$$

$I_x(\omega)$ being given by:

$$I_x(\omega) = \frac{1}{2\rho c} Re[B_{00}^{1*}(\omega) B_{11}^{1}(\omega)];$$

$I_z(\omega)$ being given by:

$$I_z(\omega) = \frac{1}{2\rho c} Re[B_{00}^{1*}(\omega) B_{01}^{1}(\omega)]$$

$B_{00}{}^1(\omega)$, $B_{11}{}^1(\omega)$, $B_{01}{}^1(\omega)$ and $B_{11}{}^{-1}(\omega)$ denoting the Fourier transforms of the signals $b_{00}{}^1(t)$, $b_{11}{}^1(t)$, $b_{01}{}^1(t)$ and $b_{11}{}^{-1}(t)$ respectively;

and wherein the elevation spherical coordinate is determined from said expression or said supplementary expression;

where t is time, c is a speed of sound waves, and ρ is a density of a propagation medium.

11. A non-transitory computer readable storage medium, with a program stored thereon, said program comprising program code instructions for implementing the steps of the method according to claim 1.

12. The method according to claim 1, wherein the item of supplementary information is determined based on a difference between a phase of the first signal and a phase of the second signal.

13. A data processing device for determining at least one spatial coordinate of a sound source emitting a sound signal, in a three-dimensional space, the device comprising:
a unit for obtaining at least one first signal and one second signal from the sound signal captured according to different directivities by a first sensor and a second sensor;
a deduction unit for deducing from the first and second signals an expression of at least one first spatial coordinate of the sound source, said expression containing an uncertainty;
a first unit for determining an item of supplementary information relating to the first spatial coordinate of the sound source, from a comparison between respective characteristics of the signals captured by the first and second sensors, wherein the item of supplementary information is determined based on a direction of an intensity vector, the direction being calculated from the first and second signals;
a second unit for determining said first spatial coordinate of the sound source based on the expression and the supplementary information.

14. A system for the acquisition of sound data, comprising a microphonic unit, said microphonic unit comprising at least one first sensor and a second sensor suitable for capturing sound signals in different directivities, said system comprising moreover a data processing device for determining at least one spatial coordinate of a sound source emitting a sound signal, in a three-dimensional space, the device comprising:
a unit for obtaining at least one first signal and one second signal from the sound signal captured by the first sensor and the second sensor;
a deduction unit for deducing from the first and second signals an expression of at least one first spatial coordinate of the sound source, said expression containing an uncertainty;
a first unit for the determination of an item of supplementary information relating to the first spatial coordinate of the sound source, from a comparison between respective characteristics of the signals captured by the first and second sensors, wherein the item of supplementary information is determined based on a direction of an intensity vector, the direction being calculated from the first and second signals;
a second unit for determining said first spatial coordinate of the sound source based on the expression and the supplementary information.

15. The system according to claim 14, wherein the first and second sensors are cardioid microphones.

16. A telecommunications terminal comprising the system according to claim 14.

17. The system according to claim 14, wherein the item of supplementary information is determined based on a difference between a phase of the first signal and a phase of the second signal.

* * * * *